(No Model.)
F. R. SIMMS.
WHEEL FOR MOTOR CARS OR OTHER VEHICLES.
No. 605,022. Patented May 31, 1898.
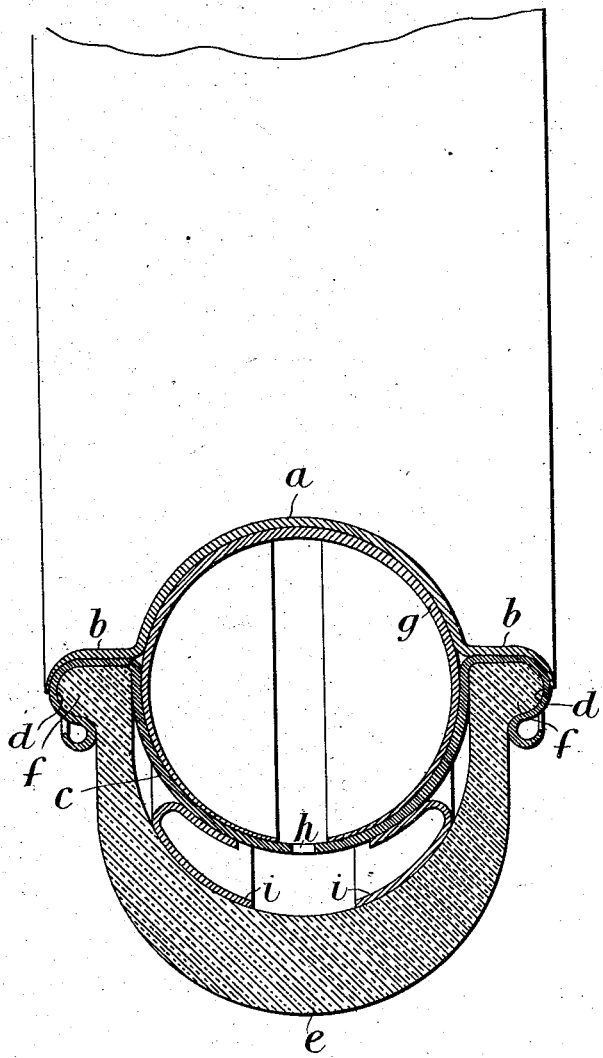
Witnesses.
J. D. Kingsbury
G. A. Taubenschmidt
Inventor.
Frederick R. Simms
By Whitaker & Prevost attys.

UNITED STATES PATENT OFFICE.

FREDERICK RICHARD SIMMS, OF LONDON, ENGLAND.

WHEEL FOR MOTOR-CARS OR OTHER VEHICLES.

SPECIFICATION forming part of Letters Patent No. 605,022, dated May 31, 1898.

Application filed December 28, 1897. Serial No. 664,067. (No model.)

*To all whom it may concern:*

Be it known that I, FREDERICK RICHARD SIMMS, a subject of the Queen of Great Britain, residing at London, England, have invented new and useful Improvements in and Connected with Wheels for Motor-Cars, Velocipedes, or other Vehicles, of which the following is a specification.

This invention relates to improvements in the construction of wheels for motor-cars, velocipedes, or other vehicles, and has for its object to provide a wheel adapted to withstand greater pressure than wheels as ordinarily constructed and also to provide a pneumatic tire which cannot be so easily punctured as pneumatic tires of ordinary construction or which when punctured shall not possess the disadvantages of such ordinary tires.

According to my invention I form the rim of the wheel (to any part of which the spokes may be attached) preferably approximately semicircular in cross-section and with lateral flanges or recesses. In conjunction with the said rim I provide an auxiliary or supplementary rim having lateral flanges adapted to fit into the lateral flanges or recesses upon the said wheel-rim. The lateral flanges of the auxiliary rim are designed to receive lateral ribs or extensions upon the tire, which is formed of a suitable elastic material and approximately semicircular in cross-section. Into the annular space between the two rims I may introduce an air-tube adapted to be inflated in the ordinary manner, the said tube being preferably split around its outer periphery and the auxiliary rim being formed with a corresponding peripheral slit or with a series of openings whereby the air-space between the two rims is put into communication with the space between the auxiliary rim and the tire. The said space is provided with strips or flaps of suitable elastic material, such as soft rubber, secured along one edge to the outer surface of the auxiliary rim so as to form valves to prevent the escape of the air, or the said flaps may be made in one piece so as to form a complete air-tight chamber when cemented onto the auxiliary rim.

In the accompanying drawing there is shown a section of a tire and rim made according to my invention.

$a$ is the wheel-rim, which is made semicircular in cross-section, and $b\ b$ the lateral flanges formed thereon. $c$ is the auxiliary or supplementary rim, also semicircular in cross-section, and $d\ d$ the lateral flanges or recesses with which it is provided.

$e$ is the tire, which is formed of rubber or other suitable elastic material and with a thickened tread portion, the said tire being of horseshoe shape, as shown, and $f\ f$ are the lateral ribs or extensions upon the said tire, which ribs enter the lateral flanges $d\ d$ upon the auxiliary rim $c$ of the tire and are designed, together with the said lateral flanges, to be secured by split pins, rivets, or the like to the lateral flanges $b\ b$ of the wheel-rim $a$.

$g$ is the inner or air tube, arranged between the two rims $a$ and $c$, the said tube being split along its outer periphery, as clearly shown, and $h$ is the peripheral slit or series of holes formed in the auxiliary rim $c$ for placing the inside of the air-tube $g$ in communication with the space between the auxiliary rim $c$ and the tire $e$.

$i\ i$ are the strips of suitable elastic material, such as soft rubber, which are secured along one edge to the outer surface of the auxiliary rim $c$ and which form valves (or if made in one a continuous air-tight chamber) to prevent the escape of the air from the said space between the auxiliary rim and the tire.

With this construction a tire of great resistance and elasticity is obtained, and should the tire be punctured too severely for immediate temporary repair the weight of the vehicle compresses the tire $e$ against the rim $c$, so that it is not rendered useless, as is the case with pneumatic tires of ordinary construction.

Having now particularly described and ascertained the nature of my said invention and in what manner the same is to be performed, I declare that what I claim is—

1. In a pneumatic tire, the combination of a rim having lateral flanges, of an auxiliary or supplementary rim perforated around its periphery and having lateral flanges or recesses, of an outer covering having lateral flanges to engage in the lateral recesses of the auxiliary rim, of strips of suitable material cemented at one end to the outer surface of the auxiliary rim and of an inner air-tube arranged between the two rims and split around its outer periphery, substantially as described.

2. The described pneumatic tire and rim for the wheels of motor-cars, velocipedes and other vehicles consisting of the rims $a$ and $c$, tire proper $e$, split inner or air tube $g$ and valve flaps or strips $i$, $i$.

FREDERICK RICHARD SIMMS.

Witnesses:
H. W. SCOTT,
ARTHUR G. HENING.